(12) United States Patent
de Boer et al.

(10) Patent No.: US 7,372,803 B2
(45) Date of Patent: May 13, 2008

(54) APPARATUS AND METHOD FOR ESTABLISHMENT AND PROTECTION OF CONNECTIONS WITHIN MESH NETWORKS

(75) Inventors: Evert de Boer, Ottawa (CA); James A. Shields, Ottawa (CA); Richard Trudel, Ile-Bizard (CA); Malcolm Betts, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1139 days.

(21) Appl. No.: 10/107,044

(22) Filed: Mar. 28, 2002

(65) Prior Publication Data

US 2003/0021222 A1 Jan. 30, 2003

(51) Int. Cl.
*G01R 31/08* (2006.01)
(52) U.S. Cl. ...................................... 370/217; 370/216
(58) Field of Classification Search ........ 370/216–223, 370/225–228
See application file for complete search history.

(56) References Cited

U.S. PATENT DOCUMENTS

| 5,870,212 | A   | * | 2/1999  | Nathan et al. ................. 398/4 |
| 5,933,258 | A   | * | 8/1999  | Flanagan et al. .............. 398/5 |
| 6,073,248 | A   | * | 6/2000  | Doshi et al. ................... 714/4 |
| 6,304,346 | B1  | * | 10/2001 | Sawada et al. ................ 398/2 |
| 6,324,162 | B1  | * | 11/2001 | Chaudhuri ................. 370/225 |
| 6,721,269 | B2  | * | 4/2004  | Cao et al. ................... 370/227 |
| 6,721,899 | B1  | * | 4/2004  | Narvaez-Guarnieri et al. . 714/4 |
| 6,848,062 | B1  | * | 1/2005  | Desai et al. ................... 714/4 |
| 6,950,391 | B1  | * | 9/2005  | Zadikian et al. ............ 370/219 |
| 6,970,417 | B1  | * | 11/2005 | Doverspike et al. ........ 370/216 |
| 6,982,951 | B2  | * | 1/2006  | Doverspike et al. ........ 370/217 |
| 6,990,064 | B2  | * | 1/2006  | Son et al. ................... 370/221 |
| 7,155,120 | B1  | * | 12/2006 | Ofek et al. ................... 398/7 |

* cited by examiner

*Primary Examiner*—Jay K. Patel
*Assistant Examiner*—Mark A. Mais (57) ABSTRACT

A node within a mesh network includes an Optical Connection Controller (OCC) and a network element. When a connection path within the mesh network is required, an OCC determines if a particular connection path requires a network element to operate as a virtual gateway to separate the mesh network into separate protection domains for that particular connection path. A connection path might require separate protection domains in cases in which the number of network elements and/or repeater/amplifier components for a particular connection path is greater than a threshold, the total length of links for the connection path is above a threshold and/or another factor that could cause the recovery time for the connection path to increase beyond an acceptable threshold level. If the OCC determines that one or more virtual gateways are required for a particular connection path, the OCC selects an appropriate network element within the network to operate as a virtual gateway for that particular connection path. Finally, the OCC assigns network elements and links to establish working and protection paths between the source network element and the virtual gateway and between the virtual gateway and the destination network element. This set-up can ensure that each connection path will have a recovery time after a failure within an acceptable range.

36 Claims, 9 Drawing Sheets

APPARATUS AND METHOD FOR ESTABLISHMENT AND PROTECTION OF CONNECTIONS WITHIN MESH NETWORKS

FIELD OF INVENTION

The present invention relates to mesh networks and, more specifically, to the establishment and protection of connections within mesh networks.

BACKGROUND OF THE INVENTION

A key consideration when designing an optical communication network is the protection of the connections that traverse the network. To provide protection to the connections, a common design technique is to provide not only a working path for communications but also a protection path for communications, the protection path providing an alternative path of communications in case the working path is disabled for any reason.

In network designs, such as a Bidirectional Line Switched Ring (BLSR), the protection paths in which communications are switched are inherent to the design. For instance, if a link between two network elements within a 2F BLSR is severed, the two network elements switch the routing of communication traffic around the severed link. This is done by directing communication traffic that is to traverse the severed link on a protection path in the opposite direction to the severed link, the protection path coupling the two network elements via the other network elements within the BLSR.

The length of time in which network elements require to switch communication traffic around a fault within a network is important to ensure that integrity of the communications is maintained. For instance, according to a Bellcore standard for BLSR, the time for rerouting traffic via the protection path within a BLSR design is specified as 50 ms (after a 10 ms detection time) for a BLSR including 16 nodes with a 1200 km circumference.

One consideration with BLSR designs is how to provide sufficient protection in adequate time in cases that the network includes a large number of network elements over large distances. One technique that has been used is to subdivide the network into a plurality of BLSRs with separate inherent protection, each of the BLSRs being referred to as a protection domain within the network. To couple the protection domains together, each of the BLSRs have at least one network element coupled to a network element within another of the BLSRs. These two network elements coupled together is commonly referred to as a gateway. In many designs, the gateway consists of a single network element that is coupled within more than one protection domain.

Figure 1:
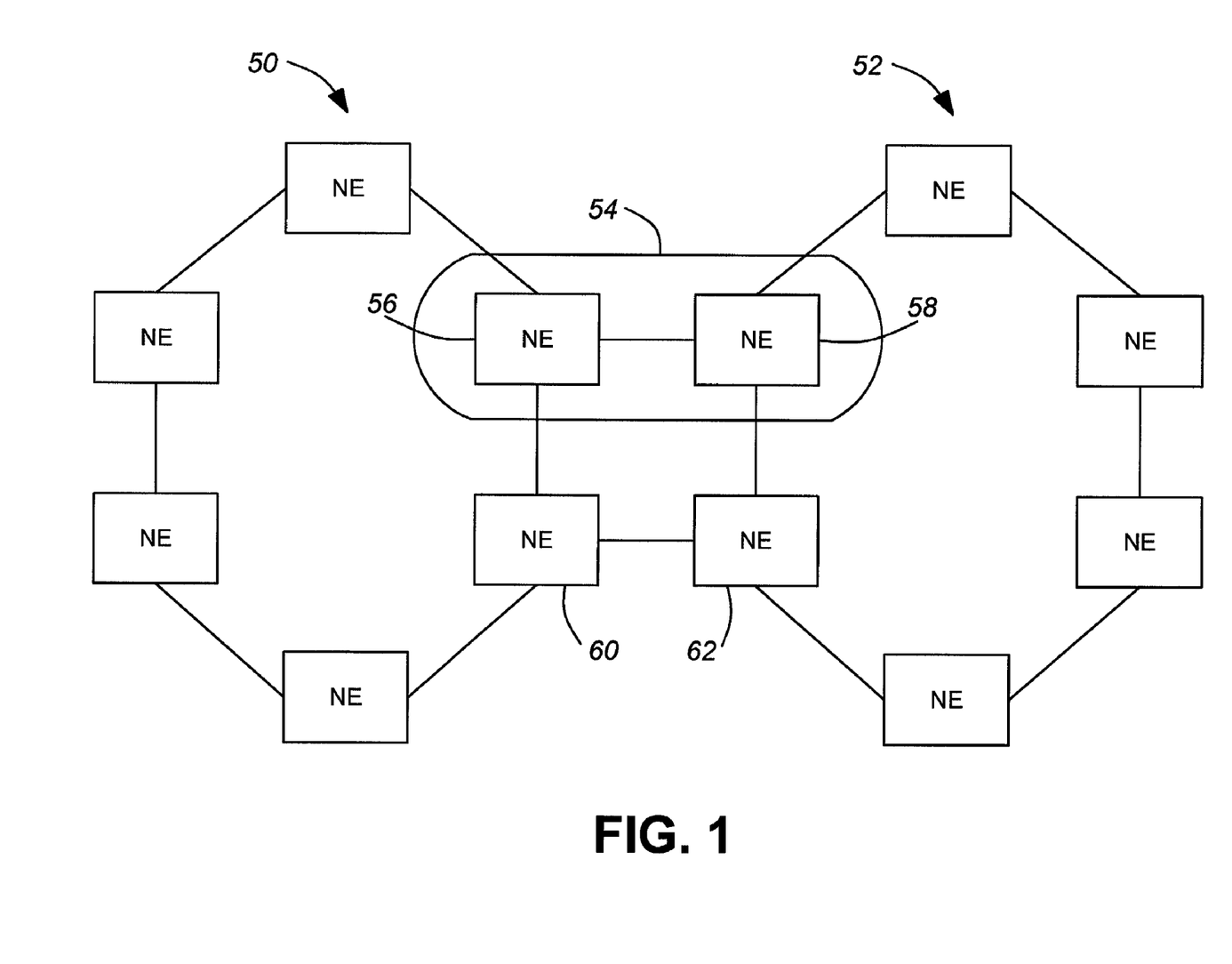
FIG. 1 illustrates two BLSR networks coupled together with a gateway.

FIG. 1 illustrates a network in which first and second BLSRs 50,52 are coupled together by a gateway 54 that consists of a first network element 56 within the first BLSR 50 and a second network element 58 within the second BLSR 52. In this network, if a fault occurs within the first BLSR 50, the protection within the first BLSR 50 route traffic around the fault while the network elements within the second BLSR 52 do not even have to be aware that a fault occurred. The opposite occurs if a fault occurs in the second BLSR 52. Therefore, if a fault occurs in either of the first or second BLSR, the time to route traffic around the fault is generally no more than 50 ms using current standards. The one exception to this time constraint is if there is a fault within the gateway 54. In this case, communications between the two protection domains could be lost. In current designs, this loss of communication is protected against by implementing match nodes such as the network elements 60,62 within the BLSRs 50,52 of FIG. 1. Match nodes are defined by Bellcore standard GR1230 and should be understood by one skilled in the art.

Within mesh networks, there is no inherent protection for a connection. For each connection within a mesh network, an Optical Connection Controller (OCC) coupled to a network element communicates with other OCCs corresponding to other network elements and establish working and protection paths for the connection within the network. These working and protection paths are unique to the particular connection and are dynamically established whenever a new connection is required within the network.

Mesh networks, as presently designed, do not have a limit on the number of network elements and links that couple together the network elements. One problem with this is that a connection between two network elements within a mesh network could be separated by a significant distance such that a connection between the network elements could traverse large numbers of network elements and large lengths of links. The more network elements and lengths of links that a connection traverses, the more likely a fault could occur in the working path for the connection. Further, the more network elements and lengths of links that a connection traverses, the longer the time that is required to switch the traffic from the working path to a protection path in the case that a fault occurs in the working path. Therefore, because of the variables involved in designing a mesh network, it is difficult to guarantee a limit on the restoration time required to reroute traffic around a fault.

SUMMARY OF THE INVENTION

The present invention is directed to apparatus and method for the establishment and protection of mesh networks. In embodiments of the present invention, each OCC coupled to a network element makes connection decisions including determining if a particular connection path requires one or more network elements to operate as virtual gateways to separate the mesh network into two or more protection domains for that particular connection path. A connection path might require one or more separate protection domains in cases in which the number of network elements and/or repeater/amplifier components for a particular connection path is greater than a threshold, the total length of links for the connection path is above a threshold and/or another factor that could cause the recovery time for the connection path to increase beyond an acceptable threshold level.

According to embodiments of the present invention, if the OCC determines that one or more virtual gateways are required for a particular connection path, the OCC selects appropriate network element(s) within the mesh network to operate as virtual gateways to divide the mesh network into separate protection domains for that particular connection path. Further, assuming that only a single virtual gateway is selected and the protection is a 1:1 or 1+1 protection, the OCC assigns network elements and links to establish working and protection paths between the source network element and the virtual gateway and between the virtual gateway and the destination network element. For cases in which further virtual gateways are selected, further working and protection paths between the virtual gateways would also be selected. Finally, the OCC for a source network element communicates its decisions with respect to the connection path with connection instructions being transmitted via a control network to other OCCs of the mesh network. Each of these other OCCs controls a corresponding network element within the mesh network and thus, these OCCs subsequently trigger their corresponding network elements to establish the connection path.

According to a first broad aspect, the present invention is a method of selecting a connection path within a network of network elements coupled together by links. In this aspect, the method includes determining a potential connection path between first and second network elements within the network and determining whether the potential connection path has a protection domain parameter that exceeds a threshold. Further, if the potential connection path exceeds the protection domain parameter, the method includes selecting at least one network element to operate as a virtual gateway and determining first and second connection paths between the first network element and the virtual gateway and between the virtual gateway and the second network element respectively.

The method of the first broad aspect could further include outputting connection instructions to control apparatus in order to establish the first and second connection paths. Further, according to another aspect, the present invention is a method similar to the first broad aspect but, if the potential connection path exceeds the protection domain parameter, the method of the second broad aspect includes selecting one or more network elements to operate as virtual gateways and determining in separate connection paths that are in series between the first network element, the one or more virtual gateways and the second network element.

According to a second broad aspect, the present invention is a control apparatus arranged to be coupled to a first network element within a network of network elements coupled together by links. The control apparatus includes connection logic, protection domain logic and virtual gateway selection logic. The connection logic operates to determine a potential connection path between the first network element and a second network element within the network. The protection domain logic operates to determine whether the potential connection path has a protection domain parameter that exceeds a threshold. The virtual gateway selection logic operates to select at least one of the other network elements to operate as a virtual gateway if the potential connection path exceeds the protection domain parameter. The connection logic further determines first and second connection paths between the first network element and the virtual gateway and between the virtual gateway and the second network element respectively if the potential connection path exceeds the protection domain parameter.

In some embodiments of the present invention according to the first and second broad aspects, the connection paths include working and protection paths. As well, in some embodiments of the present invention according to the first and second aspects, the protection domain parameter is the connection path recovery time in cases of a failure, the number of network elements and/or amplifier components within the connection path, and/or the length and/or cost of the links within the connection path.

According to a third broad aspect, the present invention is a network element arranged to be coupled within a network of network elements. The network element includes a plurality of port cards arranged to be coupled to other network elements within the network, a switch card coupled to each of the port cards, and a network element controller coupled to the switch card. The network element controller operates to control the switch card to operate in a pass through configuration for a first set of connection paths within the network that traverse the network element and operate in a virtual gateway configuration for a second set of connection paths within the network that traverse the network element.

According to a fourth broad aspect, the present invention is a network including first and second connection paths. The first connection path couples first and second network elements via a first set of pass through network elements, a first virtual gateway network element and a second set of pass through network elements. The second connection path couples third and fourth network elements via a third set of pass through network elements, a second virtual gateway network element and a fourth set of pass through network elements. According to this aspect, the first virtual gateway network element and one of the pass through network elements of the third and fourth sets is the same network element. As well, in some embodiments, the second virtual gateway network element and one of the pass through network elements of the first and second sets is the same network element and at least one of the pass through network elements of the first and second sets is the same network element as one of the pass through network elements of the third and fourth sets.

According to a fifth broad aspect, the present invention is a network including a plurality of network elements coupled together by links, the plurality of network elements forming a plurality of connection paths. Each of the connection paths couple two of the network elements via a plurality of pass through network elements and at least one virtual gateway network element. According to this broad aspect, the pass through network elements and the virtual gateway network element are independently selected for each connection path.

Other aspects and advantageous features of the present invention will become apparent to those ordinarily skilled in the art upon review of the following description of specific embodiments of the invention in conjunction with the accompanying figures.

BRIEF DESCRIPTION OF THE FIGURES

Preferred embodiments of the present invention will now be described in detail with reference to the following figures.

DETAILED DESCRIPTION OF THE PREFERRED EMBODIMENTS

Figure 2:
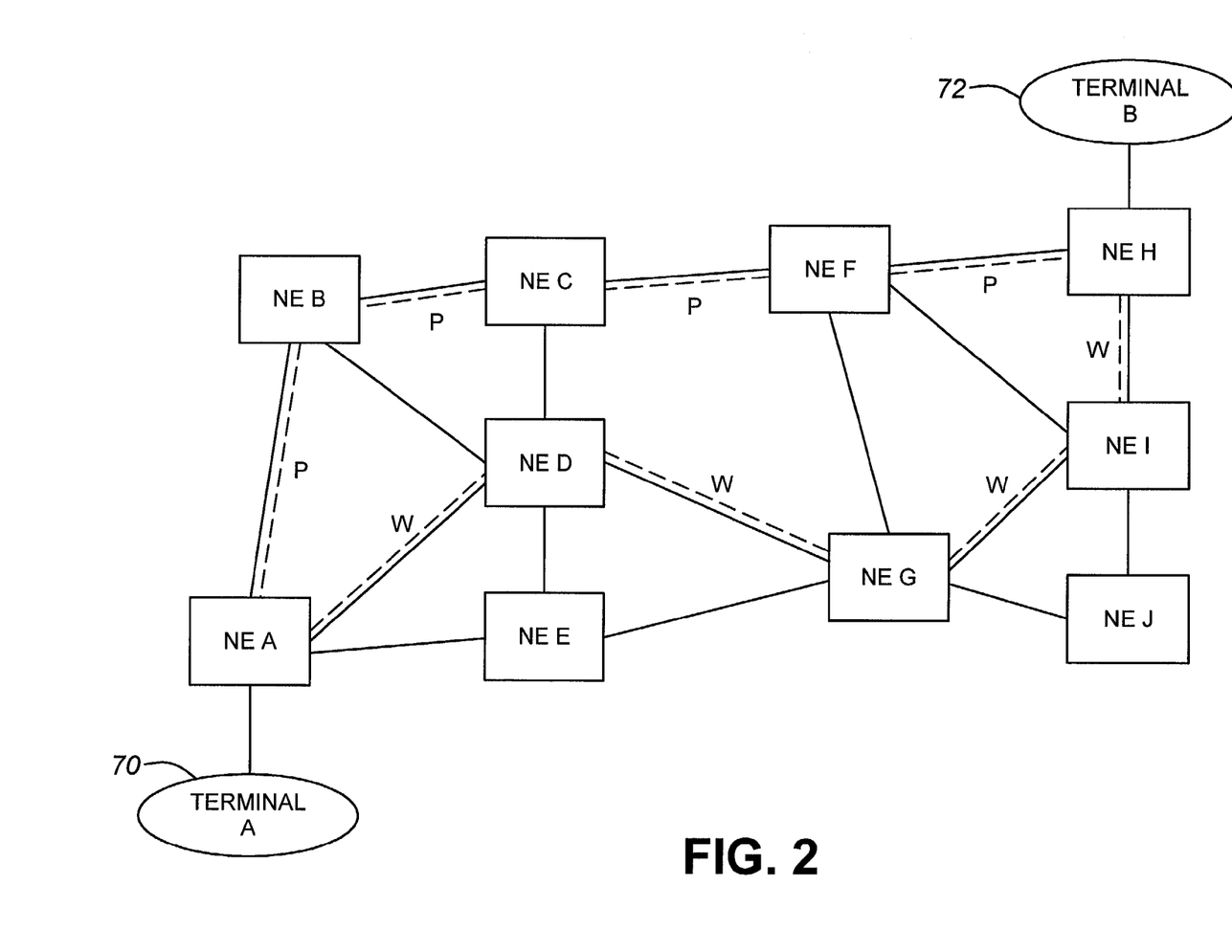
FIG. 2 illustrates a sample mesh network with a connection established.

FIG. 2 illustrates a sample mesh network comprising ten network elements A through J coupled together with various communication links. In this sample network, network element A is further coupled to a terminal A and network element H is further coupled to a terminal B. It should be understood that a typical mesh network could include more or less than ten network elements and would likely further include repeater/amplifier components between the network elements to pump the power of the signals that traverse the links. Further, it should be understood that each of the network elements A-J of FIG. 2 would be coupled to a corresponding Optical Connection Controller (OCC) (not shown) which together control the connections made between network elements of the network. Hereinafter a network element combined with its OCC is referred to as a node within the network.

In the example of FIG. 2, terminals A and B 70,72 require a connection to communicate and, hence, a connection within the mesh network is required between network element A and network element H. In normal mesh networks, an OCC associated with the originating network element (network element A in this case) would select a working path for the connection and, assuming that the connection is to be a 1:1 or 1+1 connection, would further select a protection path for the connection. Selecting a working and protection path can be done using a variety of different well-known techniques, such as shortest pair routing.

In the case illustrated in FIG. 2, a 1:1 connection is used in which a working path has been selected to go from network element A, via network elements D, G and I, to network element H. Further, a protection path has been selected to connect network element A, via network elements B, C and F, to network element H. In this particular implementation, communications between network elements A and H would normally proceed through the working path while, if a failure occurs in the working path (such as a link or node failure), the communications would be switched to the protection path.

As described previously, one potential problem with the connection setup of FIG. 2 is the potential length of the working and protection paths. If network element A is in Los Angeles and network element H is in New York, the working and protection paths will be significantly long and require numerous repeater/amplifier components to maintain the power of signals traversing the path. This significant length likely would result in a significant recovery time to reroute all traffic via the protection path if a fault occurs in the working path. Further, the likelihood of a failure in the working path increases as additional network elements and repeater/amplifier components are required within the path and as the length of the links for the path increases.

Embodiments of the present invention can limit the problem described above by dividing a connection into protection domains with dynamically selected network elements chosen to operate as virtual gateways as will be described herein below. Firstly, a description of the design of a node that could be used with embodiments of the present invention is described followed by a description of the procedure to establish a connection within a mesh network according to an embodiment of the present invention.

Figure 3:
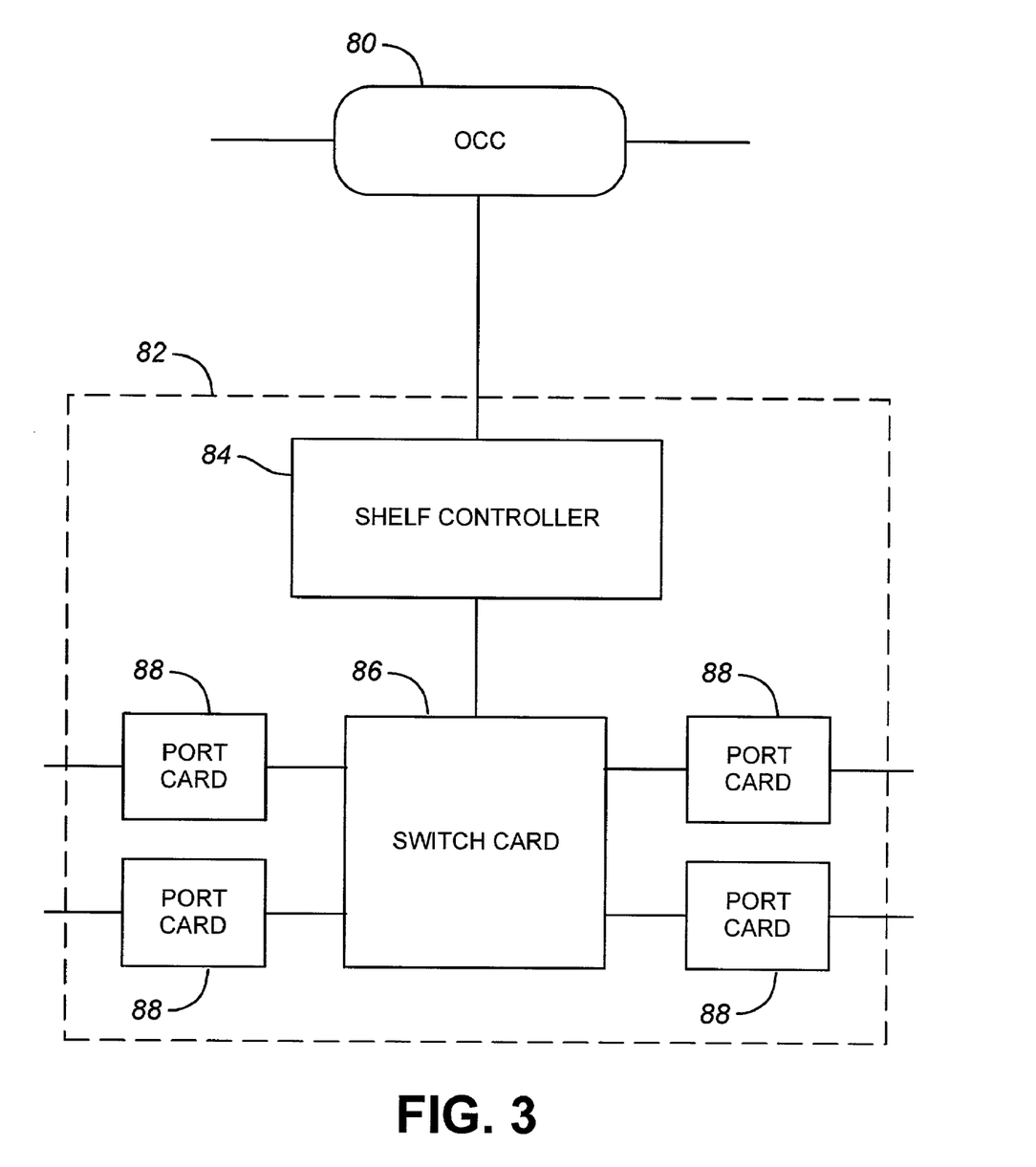
FIG. 3 illustrates a block diagram of a node within a mesh network according to an embodiment of the present invention.

FIG. 3 illustrates a block diagram of a node within a mesh network according to an embodiment of the present invention. The node of FIG. 3 comprises an OCC 80 that interfaces with other OCCs (not shown) within the mesh network and a network element 82 that is coupled to the OCC 80. The network element 82 comprises a shelf controller 84 coupled to the OCC 80, a switch card 86 coupled to the shelf controller 84, and a series of port cards 88 each independently coupled to the switch card 86 and each configured to be coupled via a link to another network element. In operation, the OCC 80 controls the network element 82 by sending configuration instructions to the shelf controller 84. The shelf controller 84 processes these instructions and subsequently commands the switch card 86 to configure the connections between the port cards 88 as per the instructions made by the OCC 80. It should be noted that four port cards are illustrated in FIG. 3 for example and it should be understood that more or less port cards within a network element is possible.

Figure 4A:
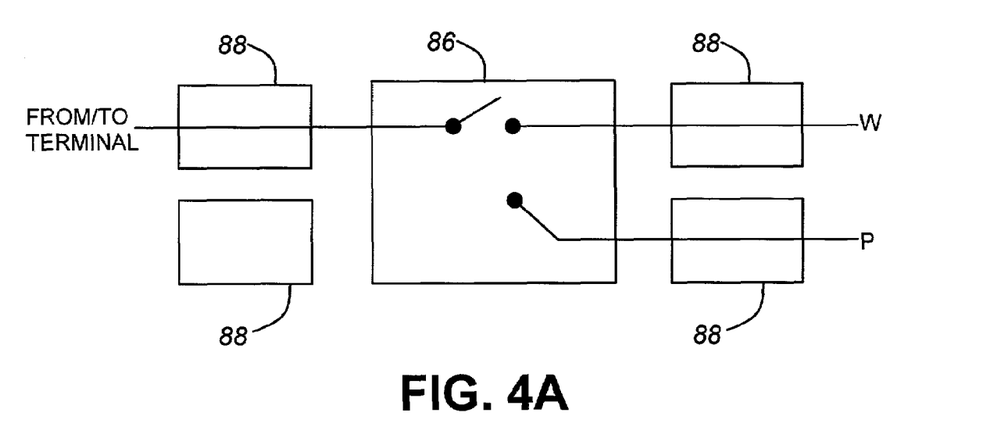
FIGS. 4A, 4B and 4C illustrate logical block diagrams of the network element of FIG. 3 in respective source/destination, pass through, and virtual gateway configurations.
Figure 4B:
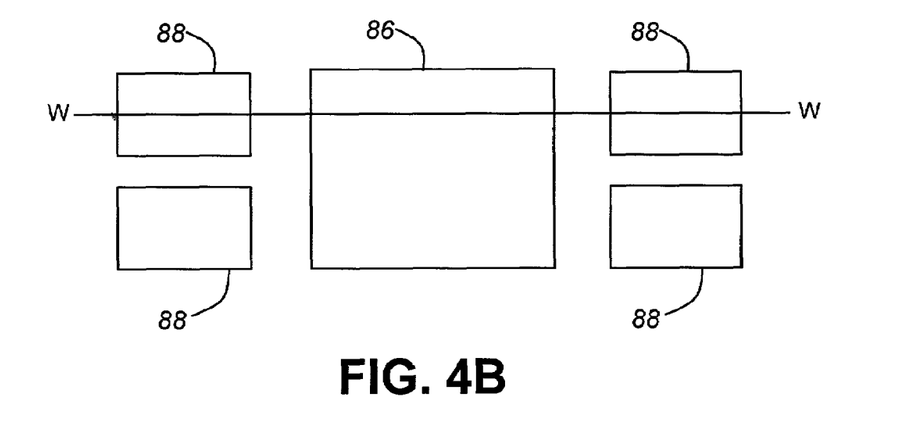
Figure 4C:
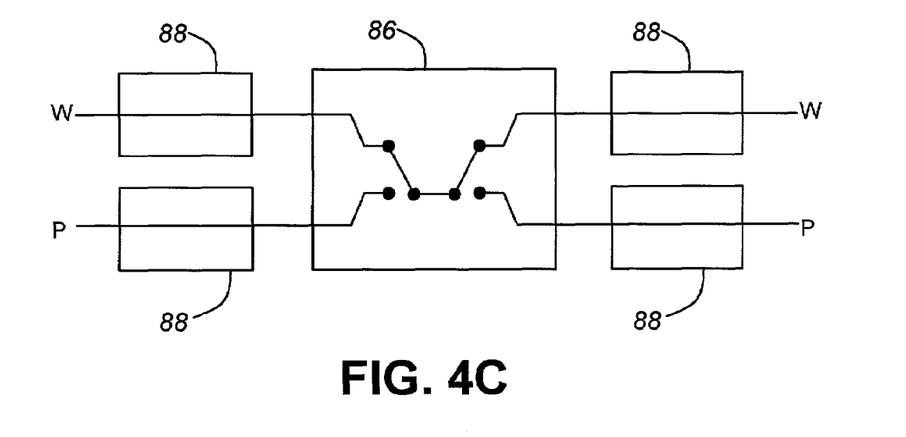

For embodiments of the present invention described herein below, there are three main configurations for the network element 82 as illustrated in FIGS. 4A through 4C, these configuration being as a source/destination network element, a pass through network element and a virtual gateway network element. In the case of a source/destination network element as illustrated in FIG. 4A, one port card 88 of the network element is coupled to a terminal, such as terminal A 70 within FIG. 2, while two other port cards 88 are coupled to working and protection paths respectively for transmitting/receiving data traffic for the terminal. In the case of a pass through network element as illustrated in FIG. 4B, the network element is simply within one of a working or protection path and simply passes through the data traffic received on one port card 88 and outputs the data traffic on another port card 88. In the case of a virtual gateway network element as illustrated in FIG. 4C, two port cards 88 are coupled to working and protection paths respectively within a first protection domain while a second two port cards 88 are coupled to working and protection paths respectively within a second protection domain. If a fault occurs within the working path of the first protection domain, then the switch card 86 switches data traffic to the protection path of the first protection domain while maintaining the use of the working path within the second protection domain. If a fault occurs within the working path of the second protection domain, the opposite switching within the switch card 86 is triggered. Essentially, in the case of a virtual gateway network element, the protection switching within each protection domain operates independently of the other protection domain.

Figure 5:
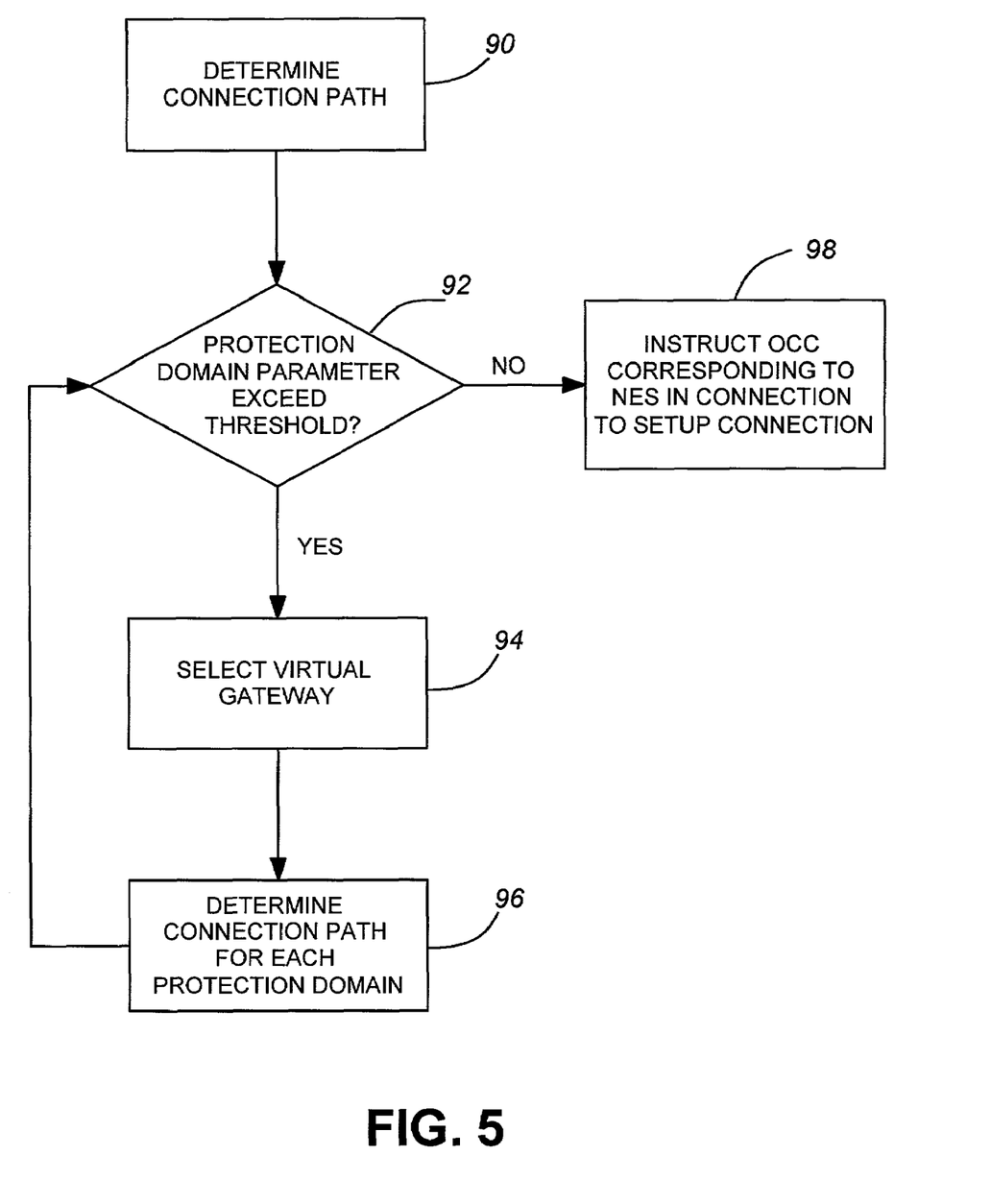
FIG. 5 illustrates a flow chart of the operation of an Optical Connection Controller while establishing a connection within a mesh network according to an embodiment of the present invention.

FIG. 5 illustrates a flow chart of the operation of the OCC 80 of FIG. 3 while establishing a connection within a mesh network according to an embodiment of the present invention. Firstly, as shown in FIG. 3, the OCC 80 determines a connection path at step 90. The determining of a connection path includes, for the case of a 1:1 or 1+1 protection scheme, determining a working path and a protection path between the source/destination network elements of the particular connection. The determination of the particular network elements and links for the working and protection paths to utilize could be done by a variety of different techniques such as determining the path with the least cost, the path with the least number of hops, the path with the lowest length of links, the path with the least number of network elements, the path with the least number of repeater/amplifier components and/or a combination of the above factors. It should be understood that the determination of the connection path could be considered the determination of a potential connection path since in embodiments of the present invention as described herein below the initial determination of a connection path is not always the connection path that is implemented.

Next, after determining a potential connection path at step 90, the OCC 80 determines if a protection domain parameter corresponding to the potential connection path exceeds a threshold at step 92. A protection domain parameter is a characteristic of a connection path that could indicate that the connection should be divided by a virtual gateway into two or more separate protection domains. In embodiments of the present invention, these protection domains are defined only for the particular connection that is being established with other connections having virtual gateways and protection domains independently defined.

There are numerous different potential protection domain parameters and any discussion of specific protection domain parameters should not limit the scope of the present invention. Some sample protection domain parameters for a connection path include the number of network elements used, the number of repeater/amplifier components used, the total length of the links used, the cost of the network elements and/or links used, and the total probability of a failure when combining the probability of a failure within all of the network elements and links used.

If a protection domain parameter for the potential connection path exceeds a threshold at step 92, the OCC 80 proceeds to select a network element to operate as a virtual gateway at step 94. The selecting of a virtual gateway is done by selecting a network element that would allow for a connection path between a source/destination network element and the virtual gateway to be established without exceeding any protection domain parameters. In some embodiments, the virtual gateway is selected such that a connection path between the source/destination network element and the virtual gateway has a protection domain parameter only slightly less than the threshold.

Next, the OCC 80 proceeds to determine a connection path, at step 96, for each of the protection domains generated by the selection of the virtual gateway. In the case of a 1:1 or 1+1 protection scheme, this step entails determining first working and protection paths between the first source/destination network element and the virtual gateway and further determining second working and protection paths between the virtual gateway and the second source/destination network element. In determining these working and protection paths, the OCC 80 can utilize similar techniques as used to determine the potential connection path of step 90.

At this point, the OCC 80 returns to step 92 and determines if the connection paths within the protection domains have protection domain parameters that exceed a threshold. In the case that the virtual gateway was selected to ensure that the subsequent connection path between the source/destination network element and the virtual gateway did not have a protection domain parameter that exceeds a threshold, the only connection path that must be checked at this point is the other connection path in the other protection domain. If the other connection path has a protection domain parameter that exceeds a threshold, the OCC 80 proceeds to select a second virtual gateway at step 94 and determine further protection domain connection paths at step 96 while treating the first virtual gateway as the first source/destination network element. The steps of 92, 94 and 96 continue until all of the protection domains have determined connection paths with protection domain parameters that do not exceed a threshold level.

If the potential connection path generated at step 90 has a protection domain parameter that does not exceed a threshold or if all of the protection domain connection paths generated at step 96 have protection domain parameters that do not exceed a threshold, then the OCC 80 proceeds to send connection instructions to the OCCs corresponding to the network elements within the connection path(s) in order to setup the connection path(s) at step 98. This instructing of the OCCs includes dictating which network elements will operate as pass through network elements such as illustrated in FIG. 4B, which network elements will operate as virtual gateway network elements such as illustrated in FIG. 4C and which of the network elements will operate as the other source/destination network element as illustrated in FIG. 4A. Further, the connection instructions indicate which port cards within each of the network elements of the network should be utilized within a pass through, virtual gateway or source/destination configuration.

Figure 6:
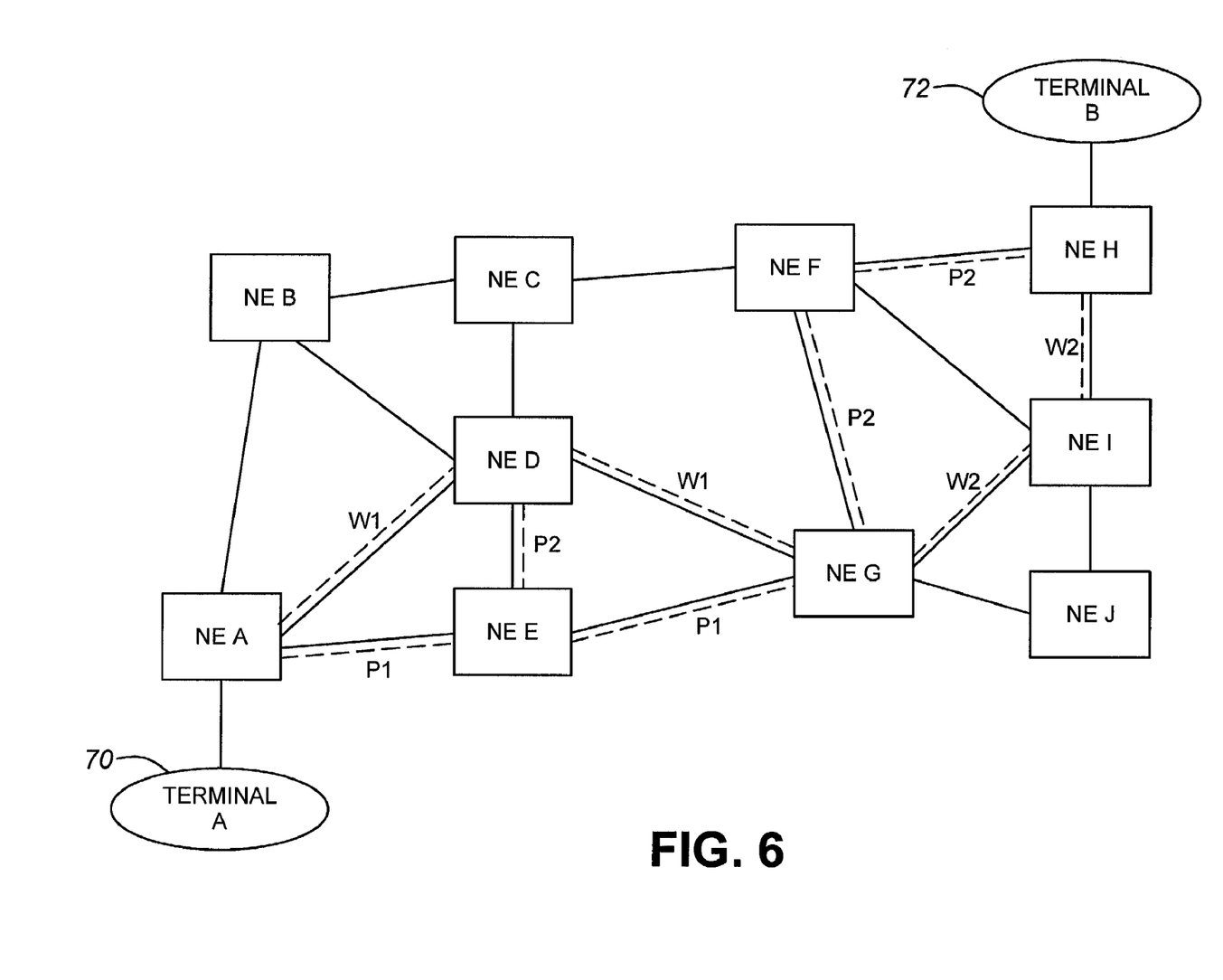
FIG. 6 illustrates the sample mesh network of FIG. 2 with a possible implementation of the present invention initiated.

FIG. 6 illustrates the sample mesh network of FIG. 2 with a possible implementation of the present invention initiated. In this case, the OCC corresponding to network element A determined that the original working and protection paths shown in FIG. 2 had a protection domain parameter that exceeded a threshold. For instance, the total length of the links within the working path may have exceeded a maximum acceptable length of links. As illustrated in FIG. 6, the OCC of network element A subsequently selected network element G as a virtual gateway, essentially dividing the mesh network into two protection domains for this particular connection. It is noted that this division in the mesh network is only for this connection and is not necessarily utilized for any other connection within the mesh network since the decision of selecting virtual gateways is preferably independent for each connection.

In FIG. 6, first working and protection paths were determined between network elements A and G while second working and protection paths were determined between network elements G and H. In the end, the OCC of network element A outputs instructions to the OCCs of the other network elements in the mesh network to establish these first and second working and protection paths. To do this, the OCC of network element A sends instructions for network element G to operate as a virtual gateway network element, for network element H to operate as a source/destination network element and for network elements D, E, I and F to operate as pass through network elements.

Figure 7A:
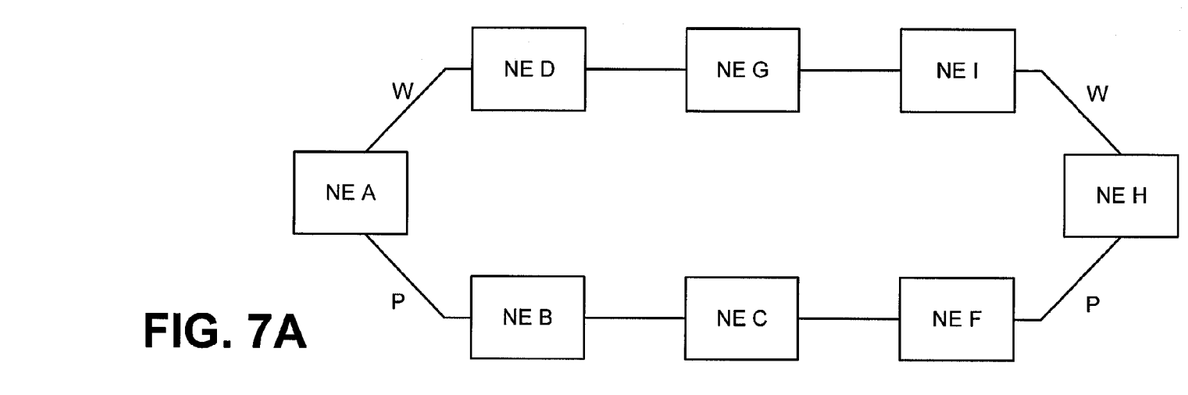
FIGS. 7A and 7B illustrate logical block diagrams of the networks of FIGS. 2 and 6 respectively.
Figure 7B:
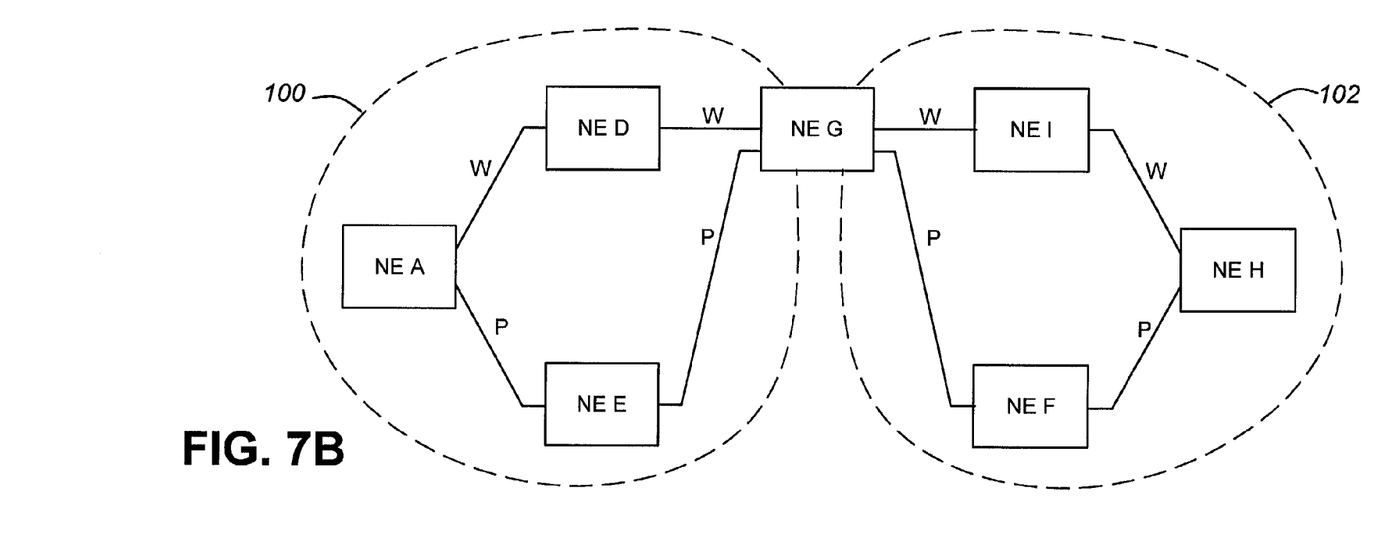

FIGS. 7A and 7B illustrate logical block diagrams of the networks of FIGS. 2 and 6 respectively. As can be seen in FIG. 7A, with no virtual gateways selected between network elements A and H, the entire mesh network is essentially a single protection domain. If a single fault occurs within the entire length of the working path, than the data traffic must be switched to the protection path. The length of time that it takes to switch the traffic to the protection path and recover traffic integrity is based upon a number of factors including the length of the links and number of network elements within the protection path. Without the use of a virtual gateway, the recovery time for a fault within the working path could exceed a desired recovery time for the network.

Within FIG. 7B, the network has essentially been divided into first and second protection domains 100,102 by the network element G operating as a virtual gateway for this particular connection. The first protection domain 100 operates independently of the second protection domain 102. If a fault occurs in the working path of the first protection domain 100 (for example, a fault in network element D), the data traffic is switched to the protection path of the first protection domain 100 (i.e. via the network element E). A similar switching would occur if a fault occurs within the working path of the second protection domain 102.

One advantage of establishing the virtual gateway within the network of FIG. 7B for the connection of FIG. 7A is that the recovery time within each of the protection domains 100,102 can be controlled such that it can be ensured that the maximum recovery time within any protection domain is below the maximum acceptable recovery time. Further, by dividing the working path of FIG. 7A into two, the network can maintain traffic integrity with a failure in both the working path of one protection domain and a failure in the protection path of the other protection domain. In the setup of FIG. 7A, a situation such as that would result in a complete failure and loss of communication integrity.

One situation that may occur within the connection setup of FIG. 7B that must be considered is a failure in the network element selected to be the virtual gateway for the particular connection, network element G in the case of FIG. 7B. In some embodiments of the present invention, if a failure occurs within the selected virtual gateway, communication integrity is lost and the OCC of one of the source/destination network elements re-establishes the connection using best effort procedures. In other embodiments, a similar design to that described above for matched nodes within a multi-BLSR network is employed to protect against the failure of a network element selected as a virtual gateway. In this case, a second network element is selected as a back-up virtual gateway and the network elements of the mesh network are configured to switch the data traffic via the back-up virtual gateway if the primary virtual gateway fails.

Figure 8:
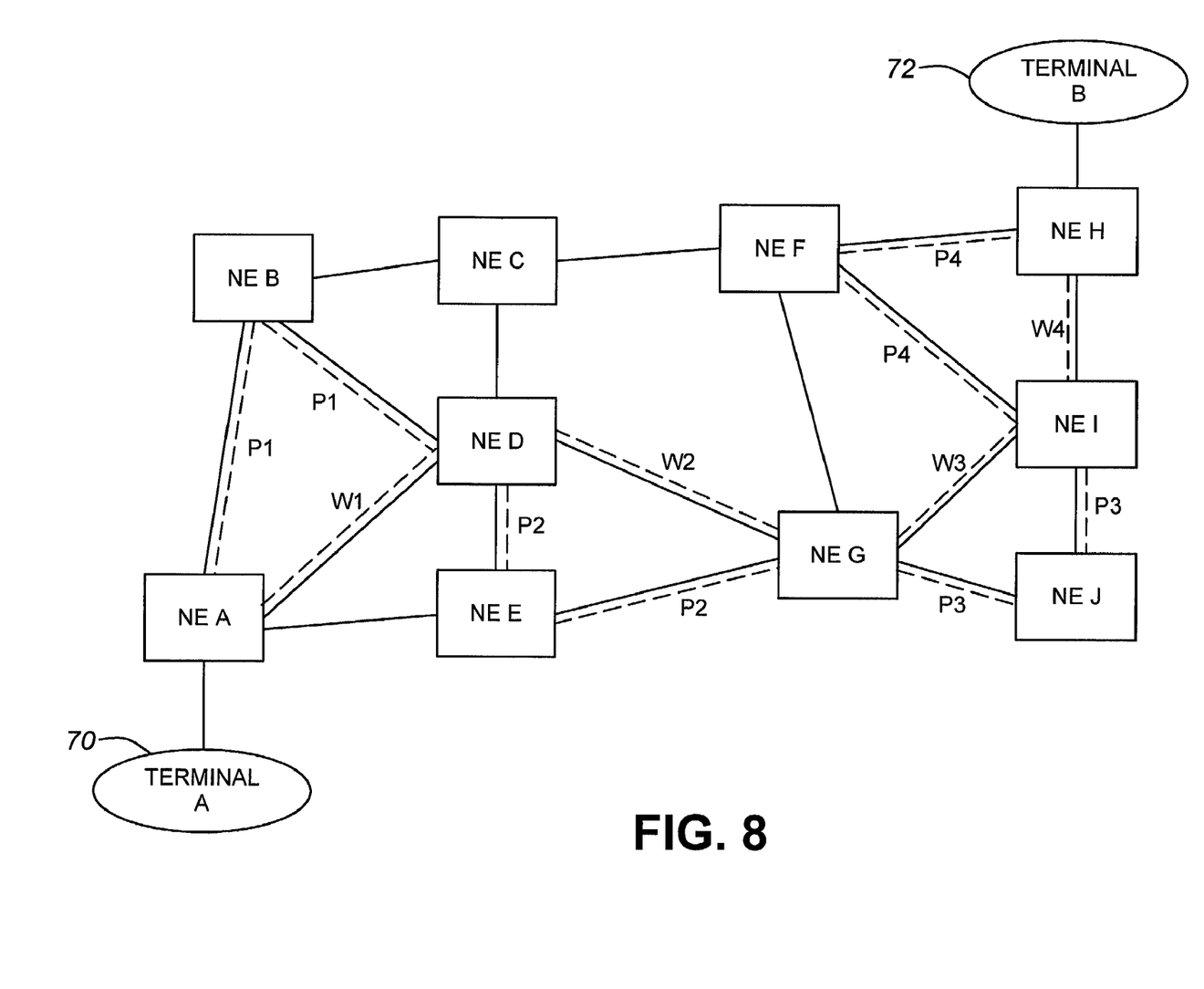
FIG. 8 illustrates the sample mesh network of FIG. 2 with a second possible implementation of the present invention initiated.

FIG. 8 illustrates the sample mesh network of FIG. 2 with a second possible implementation of the present invention initiated in which more than one virtual gateway is selected. In this case, three virtual gateways are selected to be used. This could occur in cases that a failure within a working path requires a particularly quick recovery time or the distance between the source/destination network elements is considerable. In the network of FIG. 8, there are four protection domains, each of which has a protection path that data traffic can be switched to in case there is a failure in the corresponding working path.

Although the description above is specific to 1:1 or 1+1 protection schemes, the scope of the present invention should not be limited to these protection schemes. It should be understood that the present invention could be adapted for numerous other protection schemes. For instance, an embodiment of the present invention could be implemented within a linear network that uses re-dialing of connections when a failure occurs in the connection that is carrying data traffic. One example implementation of this embodiment will now be described with reference to FIG. 9.

Figure 9:
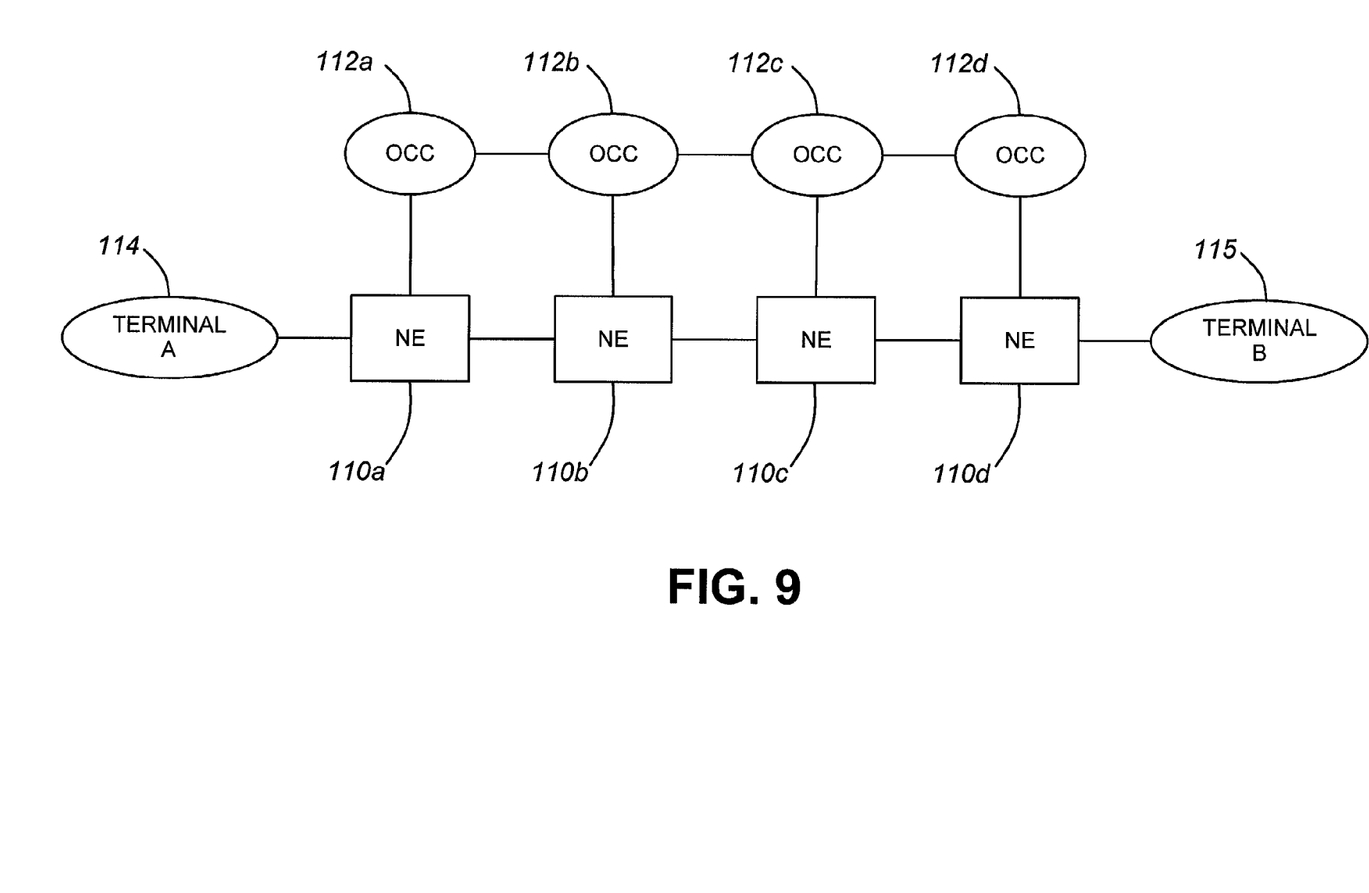
FIG. 9 illustrates a sample dial-up network in which an embodiment of the present invention could be implemented.

FIG. 9 illustrates a sample linear network in which an embodiment of the present invention could be implemented. As depicted in FIG. 9, four network elements 110a,100b, 110c,110d are coupled within a linear network, each of which has a corresponding OCC 112a,112b,112c,112d that are also coupled together in a control network. Further, a terminal A 114 is coupled to network element 110a and a terminal B 116 is coupled to network element 110d. In this network, for terminal A 114 to communicate with terminal B 116, a connection must be established between network element 110a, via network elements 110b,110c, to network element 110d. In the case of FIG. 9, the connection between these network elements is established by a dial-up procedure in which the OCC 112a triggers the network element 110a to dial-up network element 110d via network elements 110b and 110c. In this case, if a failure occurs anywhere along the connection, a re-dial procedure must be initiated. This re-dial procedure could take longer than an acceptable re-dial recovery time in some cases such as if the connection is significantly long and/or proceeds via numerous network elements.

In an embodiment of the present invention, the OCC 112a that is establishing the connection might determine that the connection has a protection domain parameter that exceeds a threshold. For example, the connection might traverse more network elements than a maximum acceptable number of network elements to ensure that a re-dial recovery time is below a maximum allowable re-dial recovery time. In this case, the OCC 112a instructs another OCC to treat its network element as a virtual gateway for the connection. This is done by essentially splitting the connection into two connections with the virtual gateway being the destination of a first connection and the source of a second connection. In this case, if a failure occurs in the first connection, only the first connection must be re-dialled. The same is true if a failure occurs in the second connection. By splitting the connection with the use of a virtual gateway, the re-dial recovery time for the connection between network elements 110a and 110d can be significantly improved.

Although the present invention was described herein above for establishing a distinct virtual gateway for each connection, it should be understood that the present invention could still apply to cases in which two or more connections share one or more commonly selected virtual gateways.

Further, it is noted that the selection of a virtual gateway by the OCC 80 for a particular connection could give preference to a border network element. For instance, a network element that connects a mesh network and a BLSR would make a natural virtual gateway for a particular connection. Further, a network element that separates the networks of two maintenance regions, such as Bell Quebec and Bell Ontario, would also make a natural virtual gateway for a connection and hence, the border network element could be selected as a virtual gateway for a series of connections that traverse a portion of both maintenance regions' networks.

Persons skilled in the art will appreciate that there are alternative implementations and modifications of the present invention, and that the above described implementation is only an illustration of specific embodiments of the invention. Therefore, the scope of the invention should only be limited by the claims appended hereto.

We claim:

1. A method of selecting a connection path within a mesh network of network elements coupled together by links, the method comprising: Determining a potential connection path between first and second network elements within the mesh network; Determining whether the potential connection path has a protection domain parameter related to recovery time that exceeds a threshold; and responsive to determining that the protection domain parameter exceeds the threshold, selecting at least one network element to operate as a virtual gateway to separate the mesh network into separate protection domains and determining first and second connection paths in a first domain between the first network element and the virtual gateway and in a second domain between the virtual gateway and the second network element respectively, wherein the first and second connection paths are determined independently.

2. A method of establishing a connection between first and second network elements within a network of network elements coupled together by links, the method incorporating the method of selecting a connection path according to claim 1 and further comprising: outputting at least one connection instruction to at least one control apparatus in order to establish the first and second connection paths.

3. A method according to claim 1, wherein the determining a potential connection path comprises determining a potential working path and a potential protection path between the first and second network elements; and wherein the determining a first connection path comprises determining a working path and a protection path between the first network element and the virtual gateway in the first domain and the determining a second connection path comprises determining a working path and a protection path between the virtual gateway and the second network element in the second domain.

4. A method according to claim 3, wherein the protection domain parameter for the potential connection path comprises the time for data traffic to be rerouted from the potential working path to the potential protection path if a failure occurs within the potential working path.

5. A method of establishing a connection between first and second network elements within a network of network elements coupled together by links, the method incorporating the method of selecting a connection path according to claim 3 and further comprising: outputting connection instructions to control apparatus in order to establish the working and protection paths between the first network element and the virtual gateway in the first domain and establish the working and protection paths between the virtual gateway and the second network element in the second domain.

6. A method according to claim 1 further comprising: determining whether the second connection path has a protection domain parameter that exceeds a threshold; and if the second connection path exceeds the protection domain parameter, selecting at least one other network element to operate as a second virtual gateway to further separate the mesh network into separate protection domains and determining third and fourth connection paths between the first virtual gateway and the second virtual gateway and between the second virtual gateway and the second network element respectively.

7. A method according to claim 1, wherein the protection domain parameter for the potential connection path comprises the time for the potential connection path to be re-dialled if a failure occurs within the potential connection path.

8. A method according to claim 1, wherein the protection domain parameter for the potential connection path is the number of network elements that the potential connection path traverses.

9. A method according to claim 1, wherein the protection domain parameter for the potential connection path is the number of amplifier components that the potential connection path traverses.

10. A method according to claim 1, wherein the protection domain parameter for the potential connection path is the length of the links that the potential connection path traverses.

11. A method according to claim 1, wherein the protection domain parameter for the potential connection path is the cost of the links that the potential connection path traverses.

12. A method of selecting a connection path within a mesh network of network elements coupled together by links, the method comprising: Determining a potential connection path between first and second network elements within the mesh network; Determining whether the potential connection path has a protection domain parameter related to recovery time that exceeds a threshold; and responsive to determining that the protection domain parameter exceeds the threshold, selecting one or more network elements to operate as virtual gateways to separate the mesh network into separate protection domains and determining separate connection paths that are in series between the first network element, the one or more virtual gateways and the second network element wherein the separate connection paths in each protection domain comprise first and second connection paths that are determined independently.

13. A control apparatus arranged to be coupled to a first network element within a mesh network of network elements coupled together by links, the control apparatus comprising: connection logic that operates to determine a potential connection path between the first network element and a second network element within the mesh network; protection domain logic that operates to determine whether the potential connection path has a protection domain parameter related to recovery time that exceeds a threshold; and virtual gateway selection logic that operates to select at least one network element to operate as a virtual gateway to separate the mesh network into separate protection domains in response to determination that the protection domain parameter exceeds the threshold; and wherein the connection logic determines first and second connection paths between the first network element and the virtual gateway in a first domain and between the virtual gateway and the second network element in a second domain respectively if the potential connection path has a protection domain parameter that exceeds the threshold, wherein the first and second connection paths are determined independently.

14. A control apparatus according to claim 13 further comprising: an output port that operates to output at least one control instruction to at least one control apparatus within the network in order to establish the first and second connection paths.

15. A control apparatus according to claim 13, wherein, to determine the potential connection path, the connection logic operates to determine a potential working path and a potential protection path between the first and second network elements; and wherein, to determine the first connection path, the connection logic operate to determine a working path and a protection path between the first network element and the virtual gateway in a first domain and, to determine the second connection path, the connection logic operates to determine a working path and a protection path between the virtual gateway and the second network element in a second domain.

16. A control apparatus according to claim 15, wherein the protection domain parameter for the potential connection path comprises the time for data traffic to be rerouted from the potential working path to the potential protection path if a failure occurs within the potential working path.

17. A control apparatus according to claim 15 further comprising: an output port that operates to output control instructions to other control apparatus within the network in order to establish the working and protection paths between the first network element and the virtual gateway in a first domain and establish the working and protection paths between the virtual gateway and the second network element in a second domain.

18. A control apparatus according to claim 13, wherein the protection domain logic further operates to determine whether the second connection path has a protection domain parameter that exceeds a threshold; wherein the virtual gateway selection logic further operates to select at least one other network element to operate as a second virtual gateway if the second connection path exceeds the protection domain parameter; and wherein the connection logic further operates to determine third and fourth connection paths between the first virtual gateway and the second virtual gateway and between the second virtual gateway and the second network element respectively if the second connection path exceeds the protection domain parameter.

19. A control apparatus according to claim 13, wherein the protection domain parameter for the potential connection path comprises the time for the potential connection path to be redialed if a failure occurs within the potential connection path.

20. A control apparatus according to claim 13, wherein the protection domain parameter for the potential connection path is the number of network elements that the potential connection path traverses.

21. A control apparatus according to claim 13, wherein the protection domain parameter for the potential connection path is the number of amplifier components that the potential connection path traverses.

22. A control apparatus according to claim 13, wherein the protection domain parameter for the potential connection path is the length of the links that the potential connection path traverses.

23. A control apparatus according to claim 13, wherein the protection domain parameter for the potential connection path is the cost of the links that the potential connection path traverses.

24. A node arranged to be coupled within a network of nodes coupled together by links, the node comprising: a network element; and a control apparatus according to claim 14.

25. A network incorporating a plurality of nodes according to claim 24, the nodes being coupled together by links.

26. A network element arranged to be coupled within a mesh network of network elements, the network element comprising: a plurality of port cards arranged to be coupled to other network elements within the mesh network; a switch card coupled to each of the port cards; and a network element controller, coupled to the switch card, that operates to control the switch card to operate in a pass through configuration for a first set of connection paths within the network that traverse the network element, said first set of connection paths having a protection domain parameter related to recovery time that does not exceed a threshold, and to operate in a virtual gateway configuration to separate the mesh network into separate protection domains for a second set of connection paths within the network that traverse the network element, said second set of connection paths having a protection domain parameter related to recovery time that does not exceed a threshold wherein each set of connection paths in each protection domain comprises first and second connection paths that are determined independently.

27. A network element according to claim 26, wherein the switch card operating in a pass through configuration comprises connecting one port card to another selected port card.

28. A network element according to claim 26, wherein the switch card operating in a virtual gateway configuration comprises connecting one of first working and protection path port cards to one of second working and protection path portcards, the selecting between the first working and protection path port cards and the selecting between the second working and protection path port cards being triggered by the network element controller.

29. A network element according to claim 26, wherein both the first and second sets of connection paths comprise at least one connection path.

30. A node incorporating a network element according to claim 26 and further comprising: a connection controller, coupled to the network element controller and further arranged to be coupled to at least one other connection controller, that operates to receive a connection instruction from at least one of the other connection controller and output a configuration instruction to the network element controller in response to the reception of the connection instruction.

31. A mesh network comprising:
a first connection path coupling first and second network elements via a first set of pass through network elements,
a first virtual gateway network element to separate the mesh network into separate protection domains and a second set of pass through network elements, said first connection path having a respective protection domain parameter related to recovery time in each of said protection domains that does not exceed a threshold; and
a second connection path coupling third and fourth network elements via a third set of pass through network elements;
a second virtual gateway network element to further separate the mesh network into separate protection domains and a fourth set of pass through network elements, said second connection path having a respective protection domain parameter related to recovery time in each of said protection domains that does not exceed a threshold;
wherein the first virtual gateway network element and one of the pass through network elements of the third and fourth sets is the same network element, and the connection path in each protection domain comprises first and second connection paths that are determined independently.

32. A network according to claim 31, wherein the second virtual gateway network element and one of the pass through network elements of the first and second sets is the same network element.

33. A network according to claim 31, wherein at least one of the pass through network elements of the first and second sets is the same network element as one of the pass through network elements of the third and fourth sets.

34. A network according to claim 31, wherein at least one of the first, second, third and fourth sets of pass through network elements comprises only a single pass through network element.

35. A network according to claim 31, wherein at least one of the first, second, third and fourth sets of pass through network elements comprises a plurality of pass through network elements.

36. A mesh network comprising:
a plurality of network elements coupled together by links, the plurality of network elements forming a plurality of connection paths;
wherein each of the connection paths coupling first couple two of the network elements via a plurality of pass through network elements and at least one virtual gateway network element to separate the mesh network into separate protection domains, the pass through network elements and the virtual gateway network element being independently selected for each connection path, and the connection path in each protection domain comprise first and second connection paths that are determined independently, each of said first and second connection paths having a respective protection domain parameter related to recovery time that does not exceed a threshold.

* * * * *